(12) United States Patent
Yun et al.

(10) Patent No.: US 12,511,716 B2
(45) Date of Patent: Dec. 30, 2025

(54) MACHINE LEARNING BASED TEMPORAL STABILIZATION OF IMAGES

(71) Applicant: QUALCOMM Incorporated, San Diego, CA (US)

(72) Inventors: Stone Yun, Toronto (CA); Alireza Shoa Hassani Lashdan, Burlington (CA); Sivakumar Chidambaram, Stouffville (CA); Darren Gnanapragasam, Aurora (CA)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 18/517,847

(22) Filed: Nov. 22, 2023

(65) Prior Publication Data

US 2025/0166131 A1   May 22, 2025

(51) Int. Cl.
*G06T 5/50* (2006.01)
*G06T 3/18* (2024.01)
*G06T 3/40* (2006.01)
*G06T 7/20* (2017.01)
*G06V 10/54* (2022.01)

(52) U.S. Cl.
CPC .................. *G06T 5/50* (2013.01); *G06T 3/18* (2024.01); *G06T 3/40* (2013.01); *G06T 7/20* (2013.01); *G06V 10/54* (2022.01); *G06T 2207/20221* (2013.01)

(58) Field of Classification Search
CPC .... G06T 5/50; G06T 3/18; G06T 3/40; G06T 7/20; G06T 2207/20221; G06T 2207/20084; G06T 3/4046; G06T 3/4053; G06T 5/60; G06V 10/54
See application file for complete search history.

(56) References Cited

U.S. PATENT DOCUMENTS

| | | | |
|---|---|---|---|
| 2024/0095880 A1* | 3/2024 | Liu | G06N 3/047 |
| 2025/0014144 A1* | 1/2025 | Bera | G06T 3/4007 |
| 2025/0104188 A1* | 3/2025 | O'Neil | G06T 3/4053 |
| 2025/0148691 A1* | 5/2025 | Aizenshtein | G06V 10/54 |

* cited by examiner

*Primary Examiner* — William A Beutel
(74) *Attorney, Agent, or Firm* — QUALCOMM Incorporated; Espartaco Diaz Hidalgo

(57) ABSTRACT

Techniques and systems are provided for image processing. For instance, a process can include generating motion vectors representing differences between a past image of a video and a current image of a video, wherein the current image occurs after the past image in the video, wherein the motion vectors are generated using a first machine learning model; applying the motion vectors to a third image to generate a warped third image; generating blending weights based on a comparison between the warped third image and the current image, wherein the blending weights are generated using a second machine learning model; upscaling the current image to generate an upscaled current image, wherein the upscaled current image is upscaled by a third machine learning model; combining the upscaled current image and a warped fourth image using the blending weights to generate an upscaled output image; and outputting the upscaled output image.

30 Claims, 10 Drawing Sheets

MACHINE LEARNING BASED TEMPORAL STABILIZATION OF IMAGES

FIELD

The present application is related to image processing. For example, aspects of the present application relate to systems and techniques for artificial intelligence (AI) and/or machine learning (ML) based temporal stabilization of images (e.g., single images) in a sequence of images (e.g., in a video).

BACKGROUND

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to generate and/or display images. For example, an image stream may include downscaled low-resolution images that represent video content. To illustrate, the image stream may be received (e.g., downloaded) from another device and may include the low-resolution images to meet transmission bandwidth limitations. As another example, the image stream may be generated at a lower resolution (e.g., by a camera, video game application, graphics processor, etc.) and is to be displayed at a higher resolution. Super resolution upscaling can be used to reconstruct a high-resolution image from a low-resolution image. An upscaled single image can have realistic looking textures, but this texture may vary from image to image, which may result in visible flicker for video.

SUMMARY

Systems and techniques are described herein for image processing. The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, apparatuses, methods and computer-readable media for image processing are provided. In one illustrative example, an apparatus for image processing is provided. The apparatus includes a memory and a processor coupled to the memory. The processor is configured to: generate motion vectors representing differences between a past image of a video and a current image of a video, wherein the current image occurs after the past image in the video, wherein the motion vectors are generated using a first machine learning model; apply the motion vectors to a third image to generate a warped third image; generate blending weights based on a comparison between the warped third image and the current image, wherein the blending weights are generated using a second machine learning model; upscale the current image to generate an upscaled current image, wherein the upscaled current image is upscaled by a third machine learning model; combine the upscaled current image and a warped fourth image using the blending weights to generate an upscaled output image; and output the upscaled output image.

As another example, a method for image processing is provided. The method includes: generating motion vectors representing differences between a past image of a video and a current image of a video, wherein the current image occurs after the past image in the video, wherein the motion vectors are generated using a first machine learning model; applying the motion vectors to a third image to generate a warped third image; generating blending weights based on a comparison between the warped third image and the current image, wherein the blending weights are generated using a second machine learning model; upscaling the current image to generate an upscaled current image, wherein the upscaled current image is upscaled by a third machine learning model; combining the upscaled current image and a warped fourth image using the blending weights to generate an upscaled output image; and outputting the upscaled output image.

In another example, a non-transitory computer-readable medium having stored thereon instructions is provided. The instructions, when executed by at least one processor, cause the at least one processor to: generate motion vectors representing differences between a past image of a video and a current image of a video, wherein the current image occurs after the past image in the video, wherein the motion vectors are generated using a first machine learning model; apply the motion vectors to a third image to generate a warped third image; generate blending weights based on a comparison between the warped third image and the current image, wherein the blending weights are generated using a second machine learning model; upscale the current image to generate an upscaled current image, wherein the upscaled current image is upscaled by a third machine learning model; combine the upscaled current image and a warped fourth image using the blending weights to generate an upscaled output image; and output the upscaled output image.

As another example, an apparatus for image processing is provided. The apparatus includes: means for generating motion vectors representing differences between a past image of a video and a current image of a video, wherein the current image occurs after the past image in the video, wherein the motion vectors are generated using a first machine learning model; means for applying the motion vectors to a third image to generate a warped third image; means for generating blending weights based on a comparison between the warped third image and the current image, wherein the blending weights are generated using a second machine learning model; means for upscaling the current image to generate an upscaled current image, wherein the upscaled current image is upscaled by a third machine learning model; means for combining the upscaled current image and a warped fourth image using the blending weights to generate an upscaled output image; and means for outputting the upscaled output image.

In some aspects, one or more of the apparatuses described herein can include or be part of an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device. In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit data or information over a transmission medium to at least one device. In some aspects, the processor includes a central processing unit (CPU), a graphics processing unit (GPU), a neural processing unit (NPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
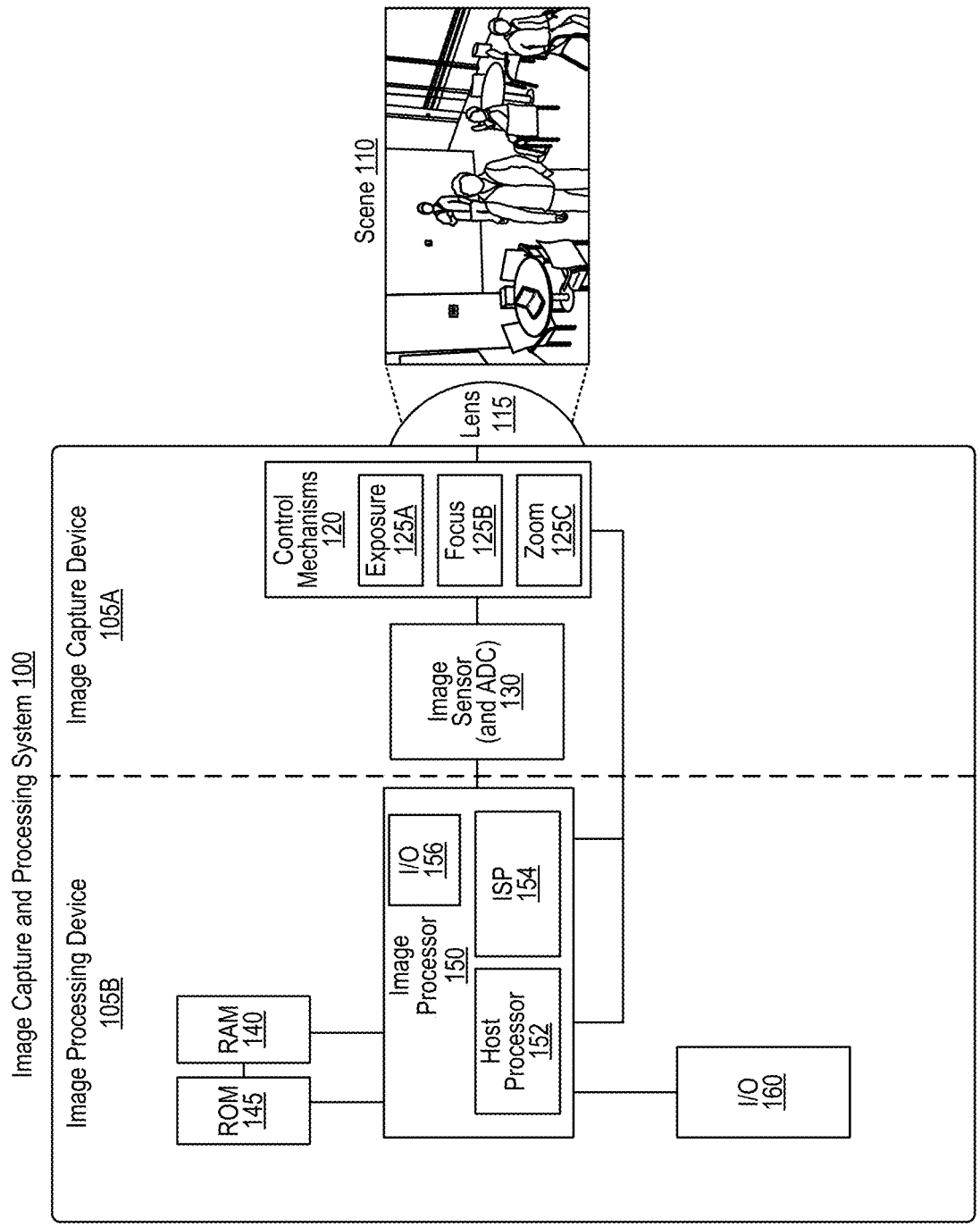
FIG. 1 is a block diagram illustrating an architecture of an image capture and processing system, in accordance with aspects of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

Upscaling is a technique that can be used to generate a high-resolution image from a low-resolution image. The high-resolution image can have added texture that does not exist in the low-resolution image. However, the added texture can be inconsistent across image frames and can result in visible flicker for a person viewing upscaled video, which can be distracting and can impair a user experience. In some cases, a machine learning (ML) model, such as a convolutional neural network (CNN) may be used to perform upscaling. Traditionally, ML-based image upscaling uses a single ML model trained to perform the upscaling. Including a temporal component to a single ML model trained to perform the upscaling may result in a relatively complex ML model with many layers. Thus, techniques for high quality video upscaling ML model may be useful.

Systems, apparatuses, electronic devices, methods (also referred to as processes), and computer-readable media (collectively referred to herein as "systems and techniques") are described herein for an ML-based upscaling of images of a sequence of images (e.g., images of a video). For example, the systems and techniques can perform an ML-based temporal stabilization of images in a video. For example, a set of ML models operating in parallel branches may be used, where one branch performs spatial upscaling, while another branch provides temporal processing to take into account previous images of the view to help avoid flicker and/or other artifacts into the upscaled images. Additionally or alternatively, in some cases, such temporal processing may also be used to help reconstruct textures and/or high resolution patterns by allowing information from multiple frames to be combined.

As an example, a past image (e.g., an image which was previously upscaled for display) may be obtained along with a current image (e.g., an image to be upscaled for display). Motion vectors describing differences between the past image and the current image may be generated. The motion vectors may be used to warp a third image, such as an upscaled version of the past image or the past image, so that the third image is similar to (e.g., the third image is adjusted to look like) the current image. Blending weights may be determined between the warped third image and the current image. The blending weights may describe how similar the warped third image and the current image are and provide information regarding how much to blend a warped fourth image (e.g., the third image or a previously upscaled output image) with a spatially upscaled version of the current image to produce (e.g., generate) an upscaled output image. The upscaled output image may then be output (e.g., for display, for further processing, for storage, any combination thereof, and/or for other uses).

In some cases, the ML-based temporal aspects (e.g., motion compensation, blending, etc.) may be adaptable to any other spatial image enhancement process. Thus, while discussed in the context of upscaling, it should be understood that the techniques discussed herein may be used for any type of ML-based temporal-based processing for enhancing input.

Various aspects of the application will be described with respect to the figures.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 8:
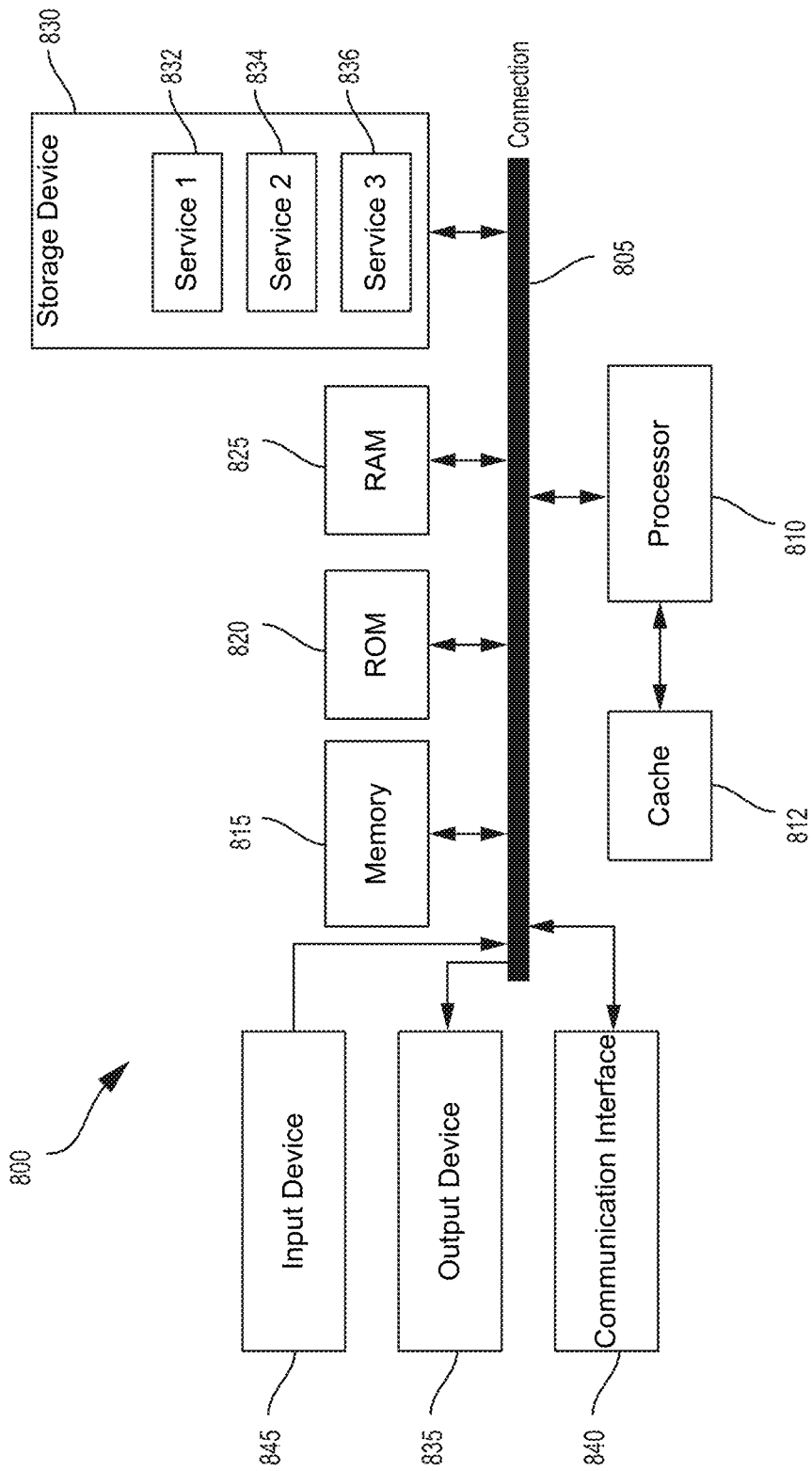
FIG. 8 is a diagram illustrating an example of a system for implementing certain aspects of the present technology.

The image processor 150 may include one or more processors, such as one or more image signal processors (ISPs) (including ISP 154), one or more host processors (including host processor 152), and/or one or more of any other type of processor 1010 discussed with respect to the computing system 800 of FIG. 8. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O devices 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.10 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

In some cases, images captured by the image capture and processing system 100 may be processed by neural networks and/or machine learning (ML) systems. A neural network is an example of an ML system, and a neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input. The connections between layers of a neural network may be fully connected or locally connected. Various examples of neural network architectures are described below with respect to FIG. 2A-FIG. 3C.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
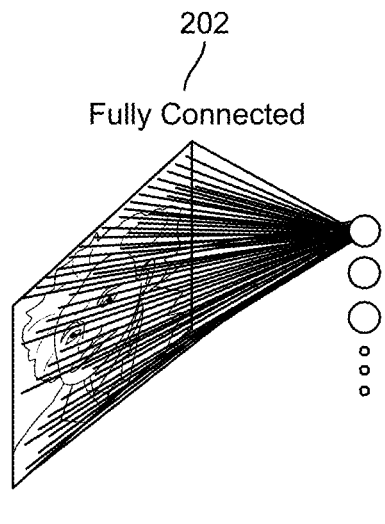
FIG. 2A is a diagram illustrating an example of a fully-connected neural network, in accordance with some examples of the present disclosure.
Figure 2B:
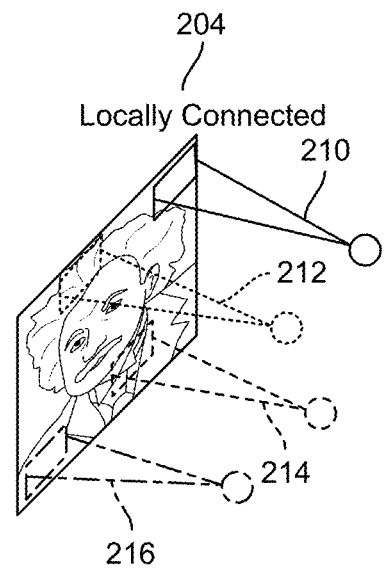
FIG. 2B is a diagram illustrating an example of a locally-connected neural network, in accordance with some examples of the present disclosure.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
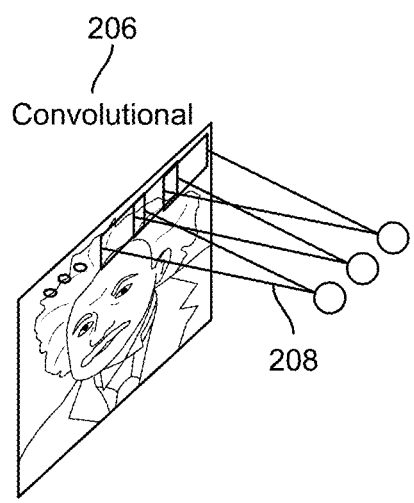
FIG. 2C is a diagram illustrating an example of a convolutional neural network, in accordance with some examples of the present disclosure.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure. One type of convolutional neural network is a deep convolutional network (DCN) (e.g., trained to recognize visual features from an image or other input).

A convolutional neural network 206 may be trained with supervised learning. During training, the convolutional neural network 206 may be presented with an image. The convolutional neural network 206 may include a feature extraction section and a classification section. Upon receiving the image, a convolutional layer may apply convolutional kernels (not shown) to the image to generate a first set of feature maps. As an example, the convolutional kernel for the convolutional layer may be a 5×5 kernel that generates 28×28 feature maps. The convolutional kernels may also be referred to as filters or convolutional filters.

The first set of feature maps may be subsampled by a max pooling layer (not shown) to generate a second set of feature maps. The max pooling layer reduces the size of the first set of feature maps. The reduced size provides similar information to a subsequent layer while reducing memory consumption. The second set of feature maps may be further convolved via one or more subsequent convolutional layers (not shown) to generate one or more subsequent sets of feature maps (not shown).

In one illustrative example, the second set of feature maps can be is convolved to generate a first feature vector and the first feature vector can be further convolved to generate a second feature vector. In some cases, an output of the convolutional neural network 206 is a probability (e.g., a probability of the input image including one or more features or objects). In some aspects, the feature vectors can be processed by a softmax function (not shown) to convert the features into probabilities. For instance, each feature of the second feature vector may include a number that corresponds to a possible feature of the image 226, such as "sign," "60," and "100." The softmax function may convert the numbers in the second feature vector 228 to a probability.

Before training, the output produced by the convolutional neural network 206 is likely to be incorrect. An error (or loss) may be calculated between the output and a target output. The target output is the ground truth of the image. The weights of the convolutional neural network 206 may then be adjusted so the output of the convolutional neural network 206 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the convolutional neural network 206 may be presented with new images and a forward pass through the network may yield an output that may be considered an inference or a prediction of the DCN.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., feature maps 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3A:
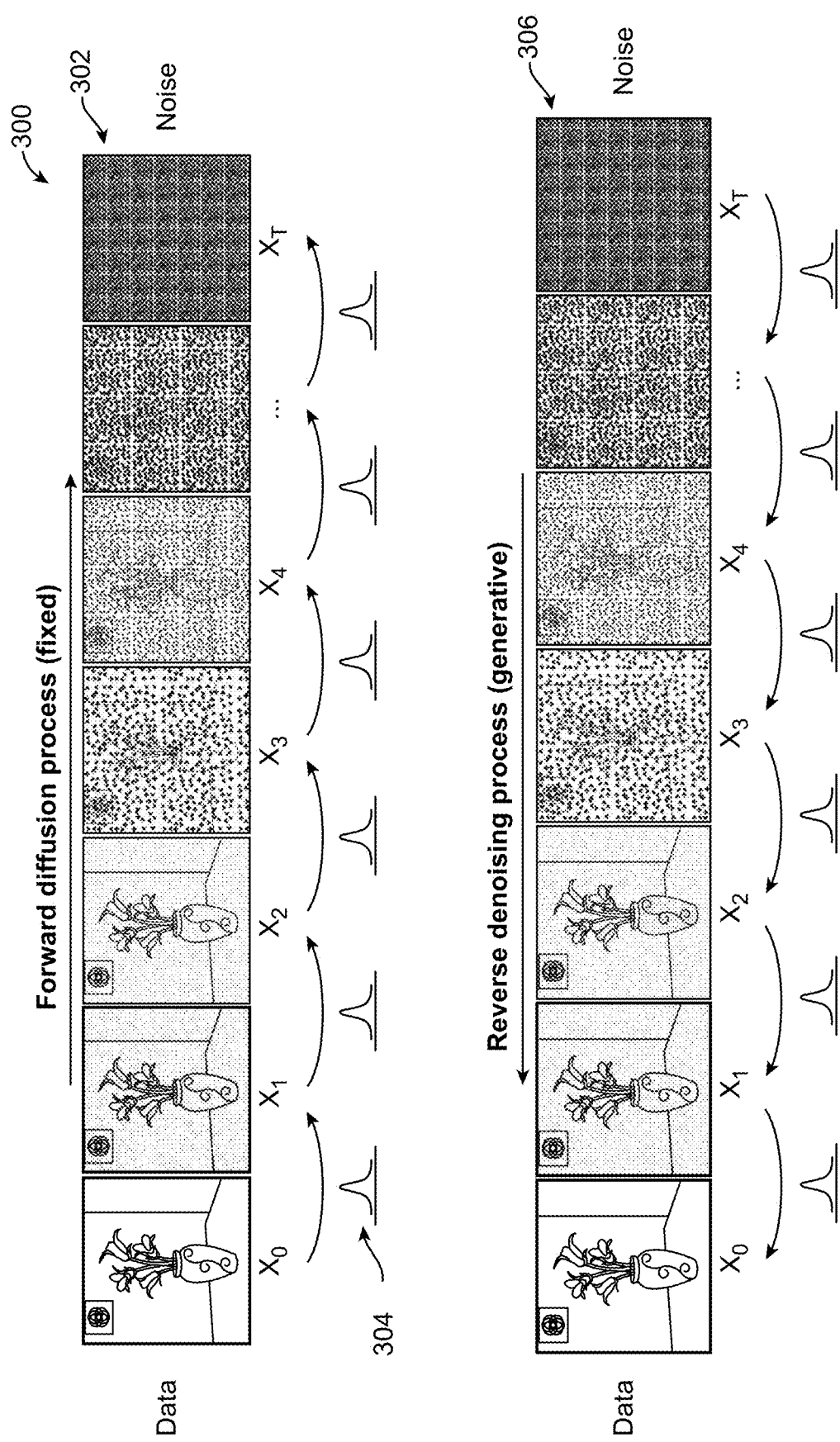
FIG. 3A provides two sets of images that show the forward diffusion process (which is fixed) and the reverse diffusion process (which is learned) of a diffusion model.

FIG. 3A provides two sets of images 300 that show the forward diffusion process (which is fixed) and the reverse diffusion process (which is learned) of a diffusion model. As shown in the forward diffusion process of FIG. 3A, noise 304 is gradually added to a first set of images 302 at different time steps for a total of T time steps (e.g., making up a Markov chain), producing a sequence of noisy samples X1 through XT.

Diffusion models from a training perspective will take an image and will slowly add noise to the image to destroy the information in the image. In some aspects, the noise 304 is Gaussian noise. Each time step can correspond to each consecutive image of the first set of images 302 shown in FIG. 3A. The initial image X0 of FIG. 3A is of a vase. Addition of the noise 304 to each image (corresponding to noisy samples X1 to XT) results in gradual diffusion of the pixels in each image until the final image (corresponding to sample XT) essentially matches the noise distribution. For example, by adding the noise, each data sample X1 through XT gradually loses its distinguishable features as the time step becomes larger, eventually resulting in the final sample XT being equivalent to the target noise distribution, for instance a unit variance zero-Gaussian $\mathcal{N}(0, 1)$.

The second set of images 306 shows the reverse diffusion process in which XT is the starting point with a noisy image (e.g., one that has Gaussian noise). The diffusion model can be trained to reverse the diffusion process (e.g., by training a model $p\theta(x_{t-1}|x_t)$) to generate new data. In some aspects, a diffusion model can be trained by finding the reverse Markov transitions that maximize the likelihood of the training data. By traversing backwards along the chain of time steps, the diffusion model can generate the new data. For example, as shown in FIG. 3A, the reverse diffusion process proceeds to generate X0 as the image of the vase. In other cases, the input data and output data can vary based on the task for which the diffusion model is trained.

As noted above, the diffusion model is trained to be able to denoise or recover the original image X0 in an incremental process as shown in the second set of images 306. In some aspects, the neural network of the diffusion model can be trained to recover Xt given Xt−1, such as provided in the below example equation:

$$q(x_t | x_{t-1}) = \mathcal{N}(x_t; \sqrt{1-\beta_t}\, x_{t-1}, \beta_t I)$$

A diffusion kernel can be defined as:

$$\text{Define } \hat{\alpha}_t = \prod_{s=1}^{t}(1-\beta_s) \rightarrow q(x_t | x_0) = \mathcal{N}(x_t; \sqrt{\hat{\alpha}_t}\, x_0, (1-\hat{\alpha}_t)I)$$

Sampling can be defined as follows:

$$x_t = \sqrt{\hat{\alpha}_t}\, x_0 + \sqrt{1-\hat{\alpha}_t}\, \varepsilon \text{ where } \varepsilon \sim \mathcal{N}(0, I).$$

In some cases, the $\beta_t$ values schedule (also referred to as a noise schedule) is designed such that $\hat{\alpha}_T \rightarrow 0$ and $q(x_T|x_0) \approx \mathcal{N}(x_T; 0, I)$.

The diffusion model runs in an iterative manner to incrementally generate the input image X0. In one example, the model may have twenty steps. However, in other examples, the number of steps can vary.

Figure 3B:
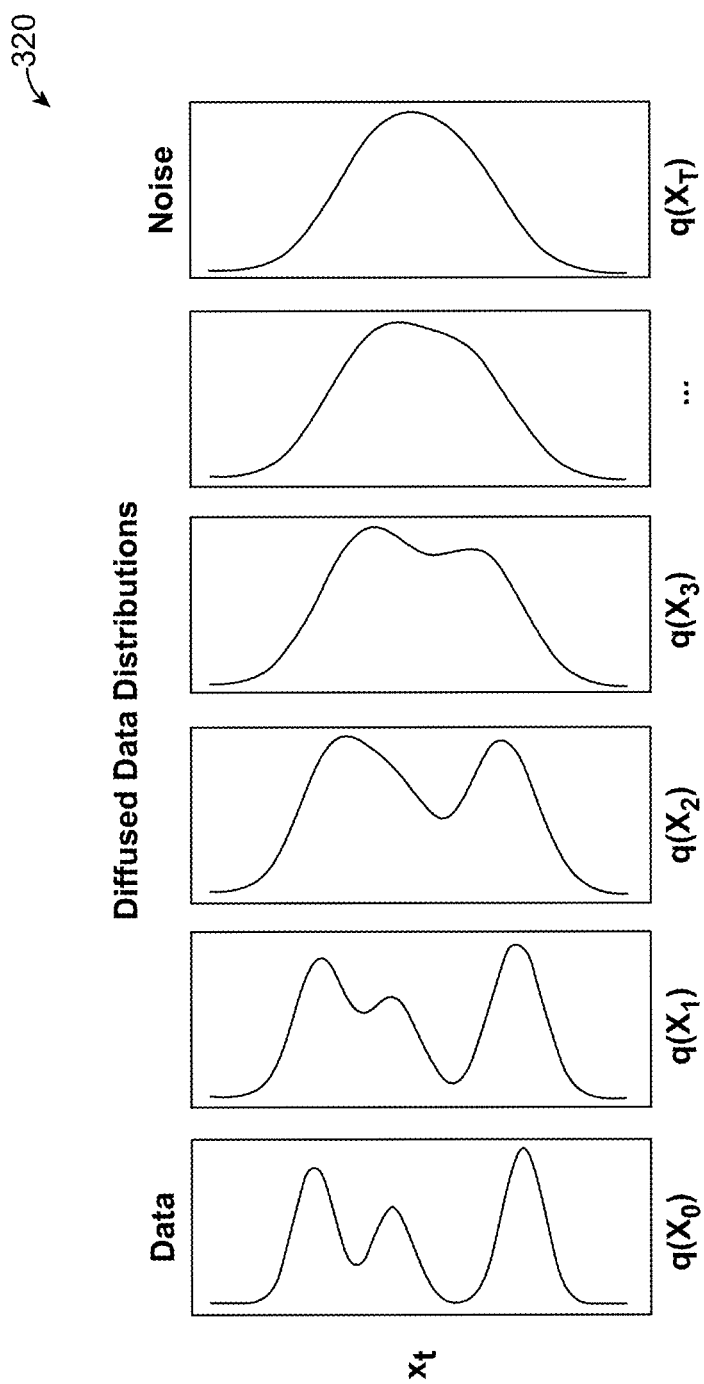
FIG. 3B is a diagram illustrating how diffusion data is distributed from initial data to noise using a diffusion model in the forward diffusion direction, in accordance with some aspects.

FIG. 3B is a diagram 320 illustrating how diffusion data is distributed from initial data to noise using a diffusion model in the forward diffusion direction, in accordance with some aspects. Note that the initial data q(X0) is detailed in the initial stage of the diffusion process. An illustrative example of the data q(X0) is the initial image of the vase shown in FIG. 3A. As the diffusion model iterates and iteratively adds sampled noise to the data from t=0 to t=T, as shown in FIG. 3B, the data becomes nosier and may ultimately result in pure noise (e.g., at q(XT)). The example of FIG. 3B illustrates the progression of the data and how it becomes diffused with noise in the forward diffusion process.

In some aspects, the diffused data distribution (e.g., as shown in FIG. 14) can be as follows:

$$q(x_t) = \int q(x_0, x_t) dx_0 = \int q(x_0) q(x_t | x_0) dx_0.$$

In the above equation, $q(x_t)$ represents the diffused data distribution, $q(x_0, x_t)$ represents the joint distribution, $q(x_0)$ represents the input data distribution, and $q(x_t|x_0)$ is the diffusion kernel. In this regard, the model can sample $x_t \sim q(x_t)$ by first sampling $x_0 \sim q(x_0)$ and then sampling $x_t \sim q(x_t|x_0)$ (which may be referred to as ancestral sampling). The diffusion kernel takes the input and returns a vector or other data structure as output.

The following is a summary of a training algorithm and a sampling algorithm for a diffusion model. A training algorithm can include the following steps:

1: repeat
2: $x_0 \sim q(x_0)$
3: t ~ Uniform ({1,...,T})
4: $\varepsilon \sim \mathcal{N}(0, I)$
5: Take gradient descent step on $$\nabla_\theta \| \varepsilon - \varepsilon_\theta\left(\sqrt{\hat{\alpha}_t}\, x_0 + \sqrt{1-\hat{\alpha}_t}\,\varepsilon, t\right) \|^2$$

6: until converged

Figure 3C:
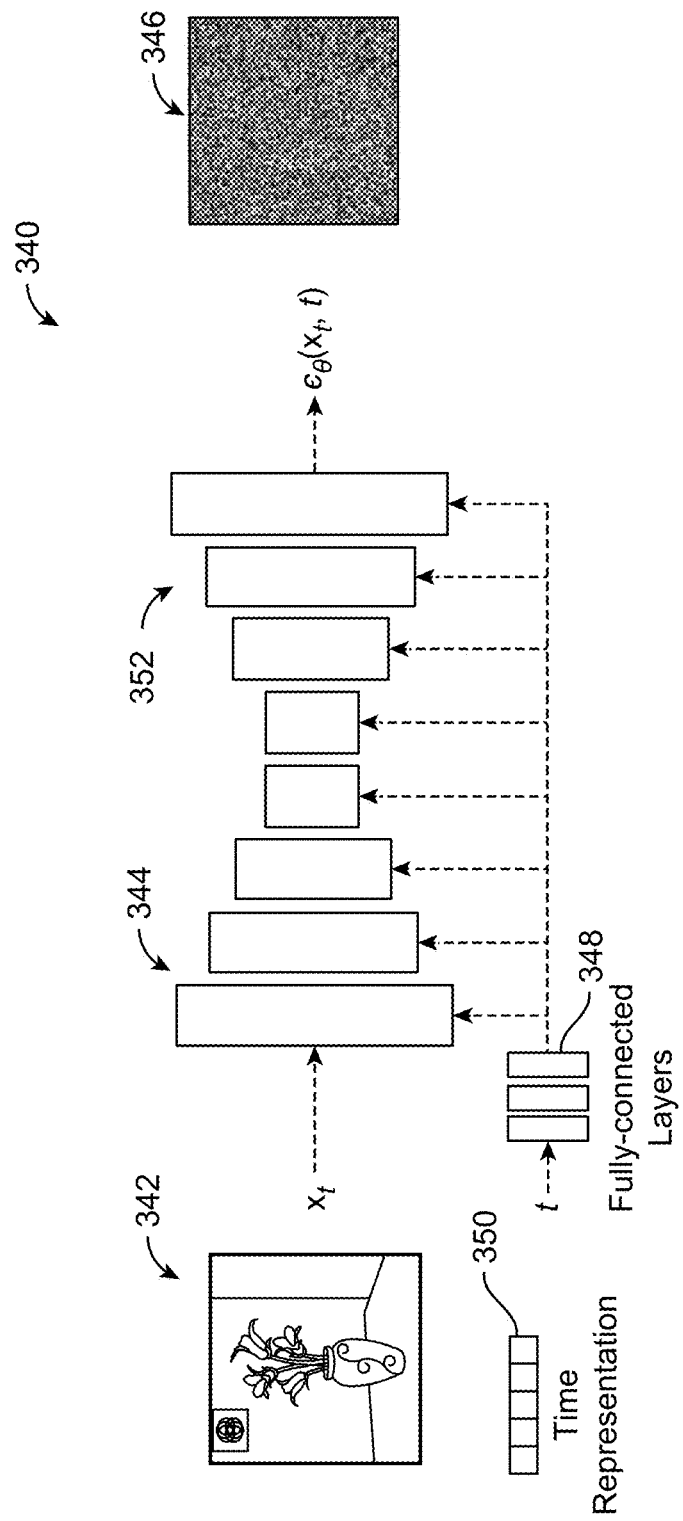
FIG. 3C is a diagram illustrating a U-Net architecture for a diffusion model, in accordance with some aspects.

A sampling algorithm can include the following steps:

1: $x_T \sim \mathcal{N}(0, I)$
2: for t = T, ... , 1 do
3: $z \sim \mathcal{N}(0, I)$ 4: $x_{t-1} = \frac{1}{\sqrt{\hat{\alpha}_t}}\left(x_t - \frac{1-\hat{\alpha}_t}{\sqrt{1-\hat{\alpha}_t}}\, \varepsilon_\theta(x_t, t)\right) + \sigma_t z$ 5: end for
6: return $x_0$ FIG. 3C is a diagram illustrating a U-Net architecture 340 for a diffusion model, in accordance with some aspects. The initial image 342 (e.g., of a vase) is provided to the U-Net architecture 340 which includes a series of residual networks (ResNet) blocks and self-attention layers to represent the network $\varepsilon\theta(x_t, t)$. The U-Net architecture 340 also includes fully connected layers 348. In some cases, time representation 350 can be sinusoidal positional embeddings or random Fourier features. Noisy output 346 from the forward diffusion process is also shown.

The U-Net architecture 340 includes a contracting path 1504 and an expansive path 1505 as shown in FIG. 15, which gives it the U-shaped architecture. The contracting path 344 can be a convolutional network that includes repeated convolutional layers (that apply convolutional operations), each followed by a rectified linear unit (ReLU) and a max pooling operation. When images are being processed (e.g., the image 342) during the contracting path 344, the spatial information of the image 342 is reduced as features are generated. The expansive path 352 combines the features and spatial information through a sequence of up-convolutions and concatenations with high-resolution features from the contracting path 344. Some of the layers can be self-attention layers, which leverage global interactions between semantic features at the end of the encoder to explicitly model full contextual information.

Machine learning (ML) models (e.g., AI) may be used to enhance videos, such as for video playback, video gaming, etc. In some cases, to enhance videos, one or more ML models may be applied to individual images of the video. Enhancing the individual images of the video may enhance the overall video. As an example, a relatively low-resolution video may be upscaled to a higher resolution using ML models to provide realistic textures to the higher resolution images. This upscaling may be performed for each image (e.g., frame) of the video. As individual images may be enhanced, subtle changes from image to image, such as due to aliasing effects, may result in inconsistent enhancements being applied from image to image, resulting in flickering or other transient artifacts that may be distracting to viewers. In some cases, techniques to avoid such artifacts may be useful. In some cases, providing the ML models enhancing the images with temporal information, such as through an AI/ML-based temporal stabilization of images in a video, may help avoid artifacts that may be occur due to inconsistent enhancements from image to image.

Of note, as used herein, "low-resolution" and "high-resolution" are relative terms. In a first example, a first image having a first resolution (e.g., corresponding to 1080p) is upscaled to generate a second image having a second resolution (e.g., corresponding to 7680p). In this example, the first image can be referred to as a low-resolution image and the second image can be referred to as a high-resolution image. In a second example, a first image having a first resolution (e.g., corresponding to 480p) is upscaled to generate a second image having a second resolution (e.g., corresponding to 1080p). In this example, the first image can be referred to as a low-resolution image and the second image can be referred to as a high-resolution image. Thus, an image having a particular resolution (e.g., corresponding to 1080p) can be considered low-resolution in some implementations and high-resolution in other implementations.

Figure 4:
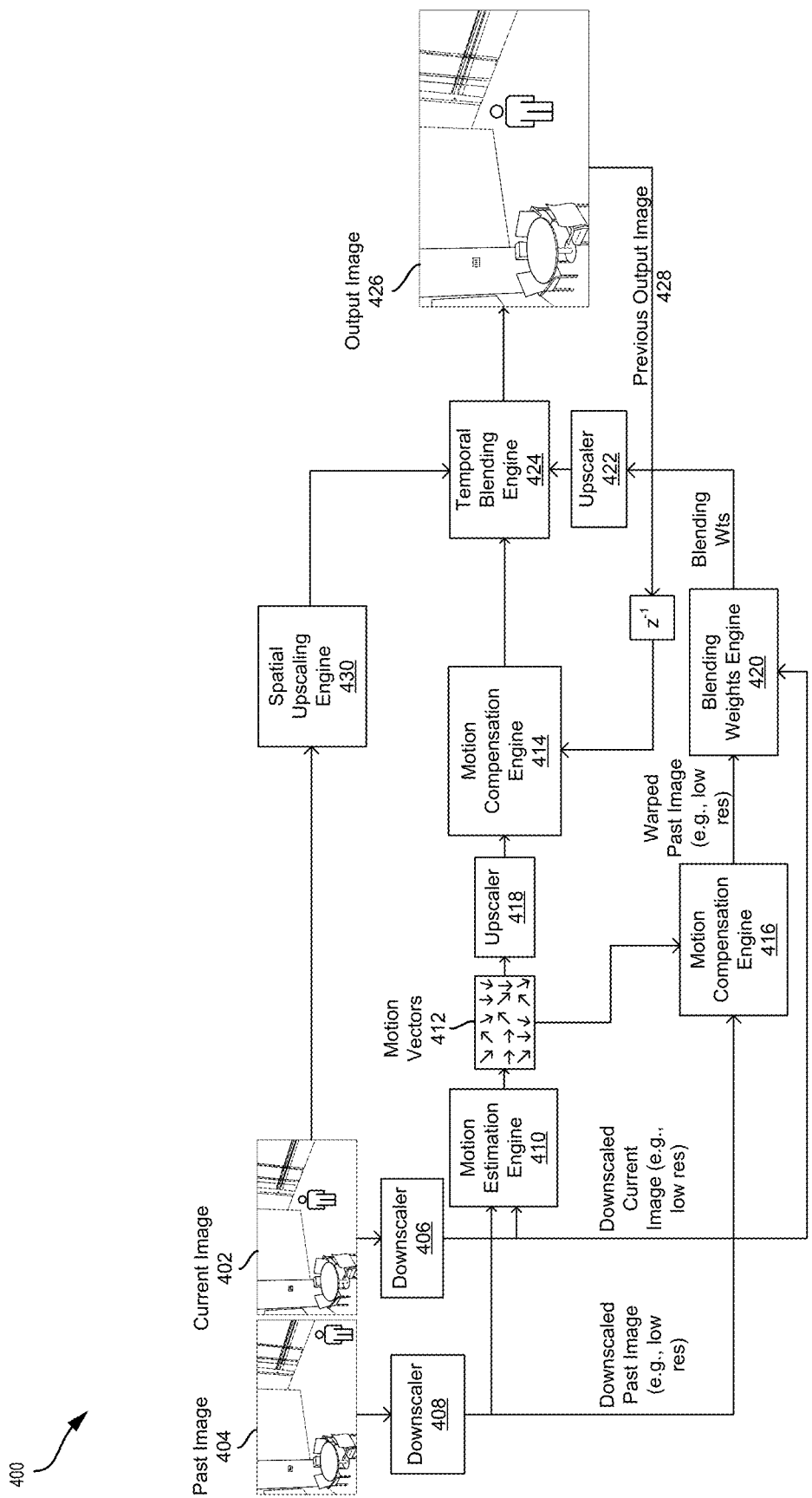
FIG. 4 is a block diagram illustrating a technique for upscaling a video using an ML model based temporal stabilization of images in a video, in accordance with aspects of the present disclosure.

FIG. 4 is a block diagram illustrating an example of a system 400 for upscaling a video using ML model-based temporal stabilization of images in a video, in accordance with aspects of the present disclosure. In FIG. 4, a current image 402 may be obtained along with a past image 404. The current image 402 may be an image from a video to be upscaled for display, while the past image 404 may be another image from the video that was previously upscaled and is being displayed or that was previously displayed. In some cases, both the current image 402 and the past image 404 may be at a resolution of the original input source (e.g., not upscaled) and may be input for upscaling. In some cases, the current image 402 and the past image 404 may be upscaled versions of the original input source. In some cases, the current image 402 and the past image 404 may be consecutive input images. For example, if the current image 402 is associated with a time t, the past image 404 may be associated with a time t−1. In some cases, the current image 402 may be obtained at a relatively higher render resolution or source resolution and may be downscaled by a downscaler 406 to a relatively lower resolution. Similarly, the past image 404 may be obtained at a relatively higher output resolution, render resolution, or source resolution and may be downscaled by a downscaler 408 to a relatively lower resolution. In some cases, downscaler 406 and downscaler 408 may be implemented as the same component. Downscaling the current image 402 and past image 404 may allow for increased performance, for example, as compared to processing the current image 402 and past image 404 at their normal (e.g., not downscaled) resolution.

In some cases, the current image 402 and the past image 404 may be input to a motion estimation engine 410. The motion estimation engine 410 may compare the past image 404 and the current image 402 to generate motion vectors 412 which describe differences (e.g., an optical flow) between one image and another image. In some cases, the motion estimation engine 410 may generate motion vectors 412 as between the current image 402 and the past image 404. In some cases, the motion estimation engine 410 may be implemented using ML-based motion estimation techniques, such as FlowNet, PWC-Net, spatial pyramid network, and other ML-based motion estimation techniques. The motion vectors 412 from the motion estimation engine 410 may be input to one or more motion compensation engines 414, 416.

In cases where the motion estimation engine 410 is ML-based, the motion estimation engine 410 may be trained using unsupervised learning with the past image 404 and the current image 402. For example, the motion estimation engine 410 may generate motion vectors as between the past image 404 and the current image 402 and the motion vectors may be applied to the past image 404 to warp the past image and the warped past image may be compared to the current image 402 to generate a loss for the motion estimation engine 410. The past image 404 and the current image 402 may also be reversed during training to provide additional training data.

In some cases, the past image 404 may also be input to a first motion compensation engine 416 of the one or more motion compensation engines 414, 416. The first motion compensation engine 416 may apply the input motion vectors 412 to the input past image 404 to align (e.g., warp) the past image 404 into a warped past image that is similar to the current image 402. This warped past image may be output from the first motion compensation engine 416 to a blending weights engine 420. In some cases, the first motion compensation engine 416 may apply the input motion vectors 412 to the input past image 404 on a block-by-block basis, where each block represents a number of pixels. For example, input motion vectors may be applied in a 4 pixel by 4 pixel (e.g., 4×4) or 8 pixel by 8 pixel (e.g., 8×8) blocks. Performing motion compensation at a block level can help reduce processing complexity.

The blending weights engine 420 may receive the warped past image along with the current image 402 and generate temporal blending weights based on a comparison between the warped past image and the current image 402. The temporal blending weights may describe how closely pixels of the warped past image align with the current image 402 and indicate what portions of the past image 404 should be blended with the current image 402. In some cases, this temporal blending weight generation may be performed using only input frames (e.g., frames for upscaling) and may be independent of the upscaled output images. The temporal blending weights may be determined per pixel and the resolution of the blending weights may be determined at the downscaled resolution (e.g., at a resolution of images output from downscalers 408 and 406). In some cases, the blending weights engine 420 may be ML-based, such as with a fully convolutional network, convolutional autoencoder model, U-net model, etc. In cases where the blending weights engine 420 is ML-based, the blending weights engine 420 may be trained using a high-resolution version of the current image 402 (e.g., for training, the current image 402 may be a downscaled version of the high-resolution image) as a ground truth to compare the output image 426 with and a gradient descent to propagate loss. In cases where the blending weights were determined at the downscaled resolution, the blending weights may be be upscaled, for example by upscaler 422, to an output resolution. The upscaled blending weights may include a blending weight for each pixel at the output resolution. The blending weights may be input to a temporal blending engine 424.

Returning to the motion vectors, in some cases, the motion vectors 412 may be upscaled by an upscaler 418 before being input to a second motion compensation engine 414 of the one or more motion compensation engines. In some cases, the motion vectors 412 may be upscaled to match an output resolution (e.g., resolution for an output image 426 that is output by the temporal blending engine 424). The second motion compensation engine 414 may also receive a version of a previous output image 428. In some cases, the previous output image 428 may be similar to (or the same as) the past image 404. For example, the previous output image 428 and the past image may be associated with the time t−1. In some cases, the previous output image 428 may be a previously upscaled version (e.g., via system 400) of the past image 404. The second motion compensation engine 414 may apply the upscaled input motion vectors 412 to the input previous output image 428 to align (e.g., warp) the previous output image 428 into a warped previous output image that is similar to an upscaled version of current image 402 output from a spatial upscaling engine 430 (e.g., at an output resolution). The warped previous output image may be output to the temporal blending engine 424.

Returning to the current image 402, the current image 402 may also be input to a spatial upscaling engine 430. The spatial upscaling engine 430 may upscale the current image 402 to an output resolution. In some cases, the spatial upscaling engine 430 may be ML model based, such as SRGAN, SRCNN, anchor-based PlainNet, QuickSRNet, etc. The upscaled current image may be output to the temporal blending engine 424.

The temporal blending engine 424 may receive the upscaled current image from the spatial upscaling engine 430, the warped previous output image from the motion compensation engine 414, and the upscaled temporal blending weights from the blending weights engine 420 and upscaler 422 and the temporal blending engine 424 may generate the output image 426. In some cases, the temporal blending engine 424 may generate the output image 426 by combining the upscaled current image with the warped previous output image based on the upscaled temporal blending weights. For example, the upscaled temporal blending weights may be used to determine how much of the warped previous output image should be combined with the upscaled current image.

In some cases, by separating the upscaling processing (e.g., by the spatial upscaling engine 430) and the temporal processing (e.g., by the blending weights engine 420 and motion compensation engines 414, 416), downscaling may be used (e.g., for the temporal processing) to help decrease processing complexity while still maintaining image quality.

Figure 5:
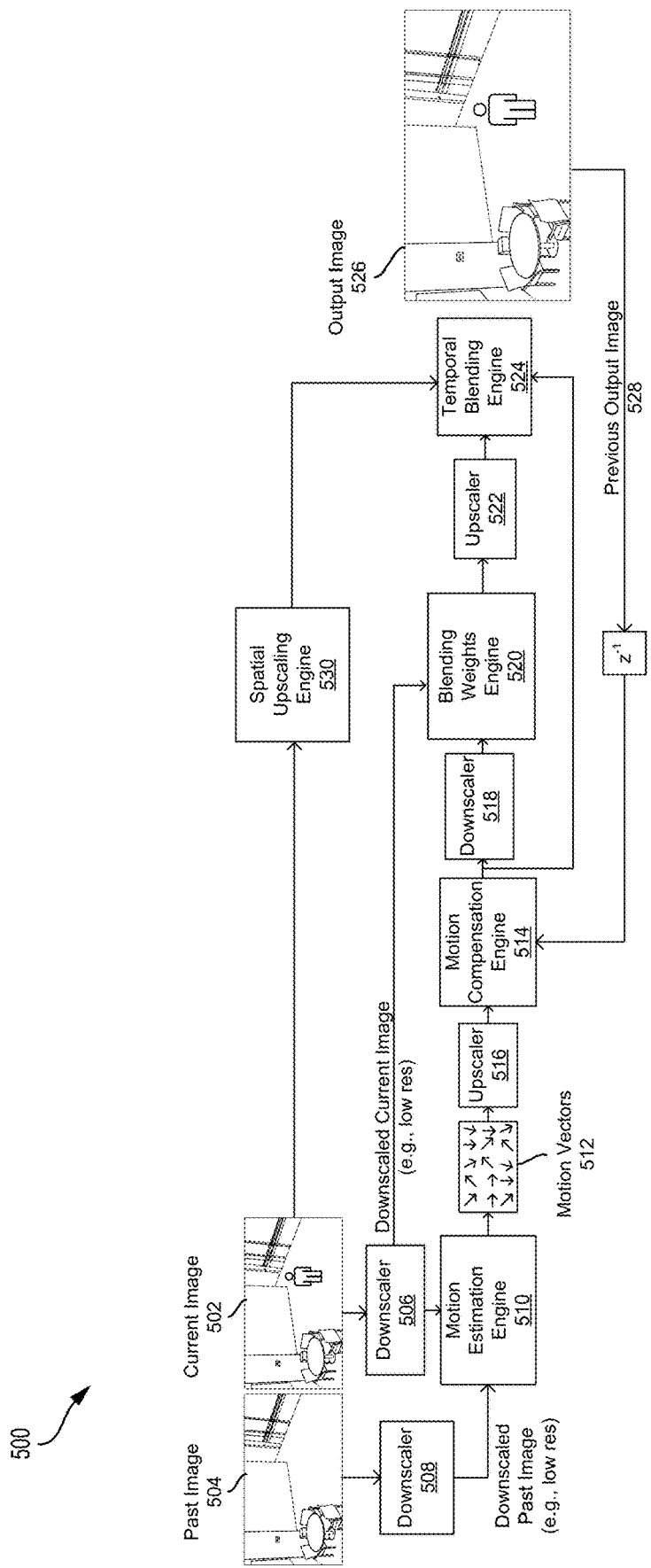
FIG. 5 is a block diagram illustrating another technique for upscaling a video using an ML model based temporal stabilization of images in a video, in accordance with aspects of the present disclosure.

FIG. 5 is a block diagram illustrating another example of a system 500 for upscaling a video using ML model-based temporal stabilization of images in a video, in accordance with aspects of the present disclosure. The example technique illustrated in FIG. 5 may primarily use a previous output image 528 for comparison against a current image 502 for blending. In a manner similar to that discussed above with respect to FIG. 4, a current image 502 may be obtained along with a past image 504 and the images may be downscaled (e.g., via downscaler 506 and 508, respectively). The current image 502 and the past image 504 may be input to a motion estimation engine 510, which may generate motion vectors 512 as between the current image 402 and the past image 404. The motion vectors 512 may be upscaled (e.g., via upscaler 516) and passed into a motion compensation engine 514. The motion compensation engine 514 may be similar to second motion compensation engine 414 of FIG. 4 and the motion compensation engine 514 may apply the input motion vectors 512 to a previous output image 528 to align (e.g., warp) the previous output image 528 into a warped previous output image that is similar to the current image 502. The warped previous output image may be passed to a temporal blending engine 524. The warped previous output image may also be downscaled (e.g., via downscaler 518) and output to the blending weights engine 520.

The blending weights engine 520 may receive the warped previous output image along with a downscaled version of the current image 502. The blending weights engine 520 may be similar to the blending weights engine 420 of FIG. 4 and the blending weights engine 520 may generate temporal blending weights based on a comparison between the warped previous output image and the current image 502. The temporal blending weights maybe upscaled (e.g., via upscaler 522) and passed into the temporal blending engine 524.

Returning to the current image 502, the current image 502 may also be passed into a spatial upscaling engine 530. The spatial upscaling engine 530 may be substantially similar to spatial upscaling engine 430 and the spatial upscaling engine 530 may upscale the current image 502 to an output resolution. The upscaled current image may be output to the temporal blending engine 524.

The temporal blending engine 524 may be similar to the temporal blending engine 424 of FIG. 4. The temporal blending engine 524 may receive the upscaled current image from the spatial upscaling engine 530, the upscaled temporal blending weights from the blending weights engine 520 and upscaler 522, and the warped previous output image from the motion compensation engine 514 and the temporal blending engine 524 may generate the output image 526 by combining the upscaled current image with the warped previous output image based on the upscaled temporal blending weights.

Figure 6:
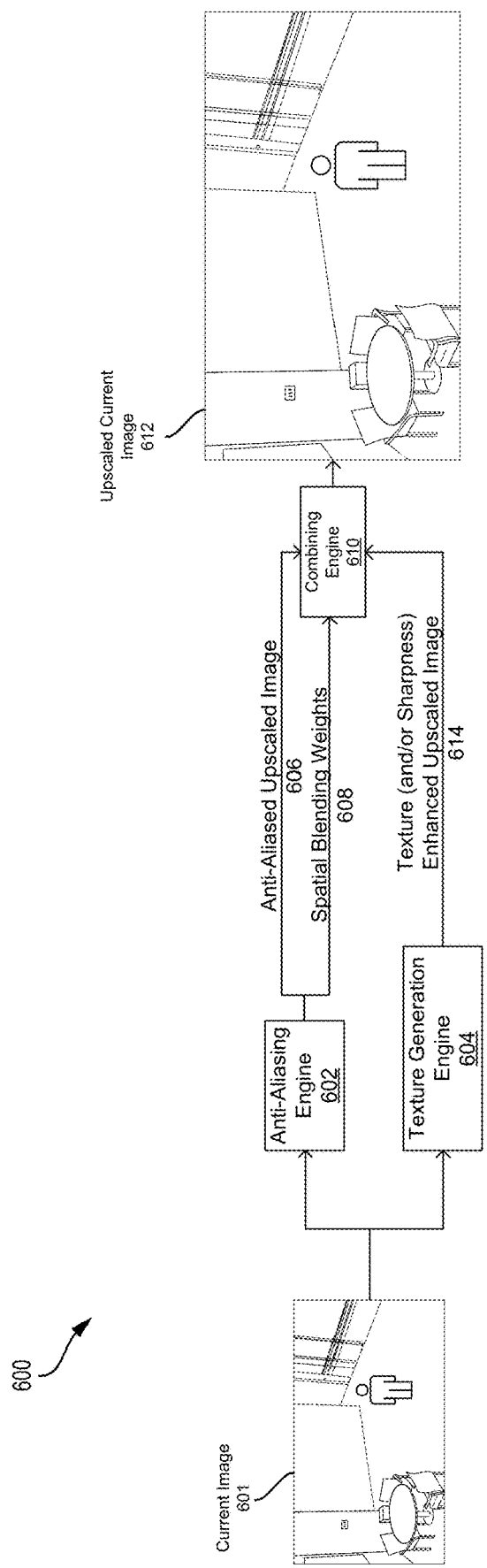
FIG. 6 is a block diagram illustrating a technique for spatial upscaling, in accordance with aspects of the present disclosure.

FIG. 6 is a block diagram illustrating a technique for spatial upscaling 600, in accordance with aspects of the present disclosure. In some cases, the spatial upscaling engine 430 of FIG. 4 and/or the spatial upscaling engine 530 of FIG. 5 may perform the technique for spatial upscaling 600. In some cases, spatial upscaling may be performed using multiple ML models to perform discrete functions for upscaling rather than a single ML model, allowing the task of upscaling to be split into two relatively smaller tasks. For example, spatial upscaling a relatively lower resolution image into a relatively higher resolution image may include anti-aliasing to help smooth out jaggy edges, such as seen on the left edge of the tree in the current image. Spatial upscaling may also include texture generation to help create details for sharp textures in the relatively higher resolution. In some cases, the technique for spatial upscaling 600 may perform anti-aliasing and texture generation separately. For example, the current image 601 may be input to an anti-aliasing engine 602 and a texture generation engine 604. In some cases, the anti-aliasing engine 602 may be an ML model trained to upscale an input image, such as the current image 601, and perform anti-aliasing on the upscaled image to smooth edges in the upscaled image to produce an anti-aliased upscaled image 606. In other cases, the anti-aliasing engine 602 may perform upscaling using a traditional upscaling technique such as bilinear or bicubic upscale, and use an ML model trained to perform anti-aliasing to produce the anti-aliased upscaled image 606. The anti-aliasing engine 602 may also produce a set of spatial blending weights 608 (e.g., based on the current image 601 and/or anti-aliased upscaled image), which may describe how the anti-aliased upscaled image 606 differs from a texture-enhanced upscaled image 614 and describes how to combine the anti-aliased upscaled image and the texture-enhanced upscaled image 614 together. Of note, in other examples, the set of spatial blending weights 608 may be generated by the texture generation engine 604 or may be generated independently of the anti-aliasing engine 602 and/or texture generation engine 604. In some cases, the anti-aliased upscaled image 606 may have relatively sharp and smooth edges for objects in the anti-aliased upscaled image 606, but textures of the objects may be relatively less detailed and/or less sharp. In some examples, the anti-aliasing engine 602 may be trained using higher resolution images and downscaled versions of the higher resolution images with a loss determined, for example, based on differences between detected edges. The anti-aliased upscaled image 606 and the spatial blending weights 608 may be passed into a combining engine 610.

As indicated above, the current image 601 may also be input to the texture generation engine 604. The texture generation engine 604 may be an ML model trained to upscale an input image, such as the current image 601, and generate a texture (and/or sharpness) enhanced upscaled image 614. In other cases, the texture generation engine 604 may perform upscaling using a traditional upscaling technique (e.g., bilinear upscaling or bicubic upscaling). In some aspects, the texture generation engine 604 can use an ML model trained to generate textures based on upscaled images (e.g., using the upscaled image generated using the traditional upscaling techniques as input) to produce the texture-enhanced upscaled image 614. In some aspects, rather than the ML model generating texture based on the upscaled image, the ML model can be trained to generate an adjustment image (which may be referred to as a texture (and/or high frequency) adjustment image) based on the current image 601 (e.g., using the current image 601 as input). The texture generation engine 604 can then combine the adjustment image with the upscaled image (e.g., generated using the traditional upscaling technique) to produce the texture (and/or sharpness) enhanced upscaled image 614. In some cases, a similar process can be performed by the anti-aliasing engine 602, where the ML model can produce, based on an input image, an "anti-aliasing adjustment image" that is combined with an upscaled image (e.g., generated using the traditional upscaling technique) to generate an anti-aliased image.

In some cases, the texture-enhanced upscaled image 614 may include detailed and/or sharp textures, but objects in the upscaled image may have relatively jaggy edges. In some cases, the texture generation engine 604 may be trained on using higher resolution images and downscaled versions of the higher resolution images. The texture-enhanced upscaled image 614 may be passed into the combining engine 610.

The combining engine 610 may receive the anti-aliased upscaled image 606, the spatial blending weights 608, and the texture-enhanced upscaled image 614 and generate the upscaled current image 612 by combining the anti-aliased upscaled image 606 and the texture-enhanced upscaled image 614 based on the spatial blending weights 608. In some cases, the combining engine may perform an element-wise multiplication and addition process. For example, the combining engine 610 may, on a per pixel basis, apply (e.g., multiply) the spatial blending weights 608 (and/or an adjusted version of the spatial blending weights 608) to the texture-enhanced upscaled image 614 and anti-aliased upscaled image 606 and combine the anti-aliased upscaled image 606 and texture-enhanced upscaled image 614 to generate the upscaled current image 612 for output. Spatial blending weights applied to the texture-enhanced upscaled image 614 may be different than the spatial blending weights applied to the anti-aliased upscaled image 606. For instance, as noted above, the spatial blending weights 608 may be applied to the texture-enhanced upscaled image 614 and an adjusted version of the spatial blending weights 608 may be applied to the anti-aliased upscaled image 606.

In some aspects, training of one or more of the machine learning systems or networks described herein (e.g., such as system 400 of FIG. 4, the system 500 of FIG. 5, among various other machine learning networks) can be performed using online training, offline training, and/or various combinations of online and offline training. In some cases, online may refer to time periods during which the input data (e.g., such as the current and past images 402, 404 of FIG. 4, etc.) is processed, for instance for performance of the temporal stabilization processing implemented by the systems and techniques described herein. In some examples, offline may refer to idle time periods or time periods during which input data is not being processed. Additionally, offline may be based on one or more time conditions (e.g., after a particular amount of time has expired, such as a day, a week, a month, etc.) and/or may be based on various other conditions such as network and/or server availability, etc., among various others.

Figure 7:
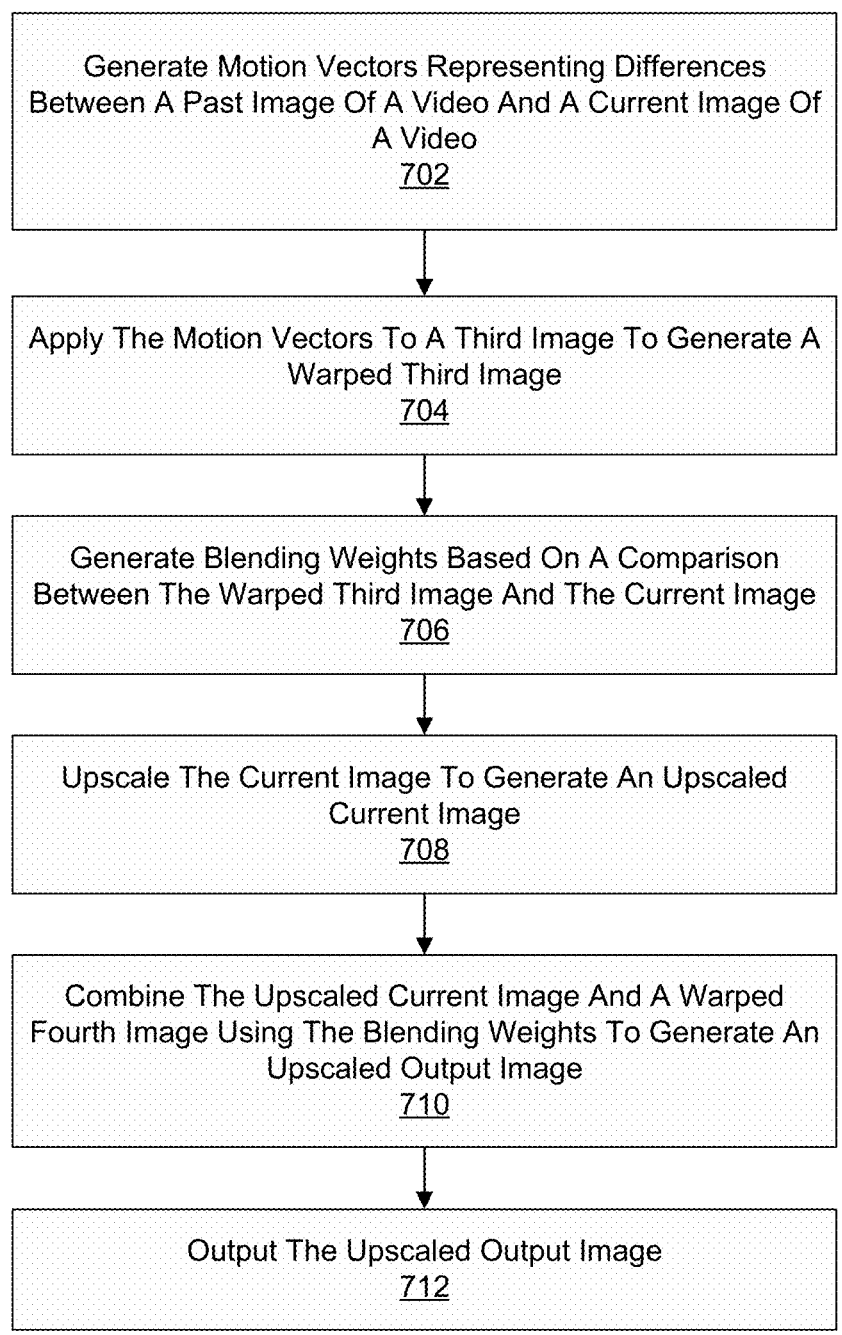
FIG. 7 is a flow diagram illustrating a process for processing image data, in accordance with aspects of the present disclosure.

FIG. 7 is a flow diagram illustrating a process 700 for processing image data, in accordance with aspects of the present disclosure. The process 700 may be performed by a computing device (or apparatus) or a component (e.g., a chipset, codec, etc.) of the computing device, such as image capturing and processing system 100 of FIG. 1. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 700 may be implemented as software components that are executed and run on one or more processors (e.g., the image processor 150 of FIG. 1, the host processor 152 of FIG. 1, processor 810 of FIG. 8, and/or other processor(s)). In some cases, the operations of the process 700 can be implemented by a system having the architecture of computing system 800 of FIG. 8.

At block 702, the computing device (or component thereof) may generate motion vectors (e.g., motion vectors 412 of FIG. 4, motion vectors 512 of FIG. 5) representing differences between a past image (e.g., past image 404 of FIG. 4, past image 504 of FIG. 5) of a video and a current image (e.g., current image 402 of FIG. 4, current image 502 of FIG. 5) of a video, wherein the current image occurs after the past image in the video, wherein the motion vectors are generated using a first machine learning model (e.g., of motion estimation engine 410 of FIG. 4, motion estimation engine 510 of FIG. 5). In some examples, the computing device (or component thereof) may downscale (e.g., by downscaler 408 of FIG. 4, downscaler 508 of FIG. 5) the past image; and downscale (e.g., by downscaler 406 of FIG. 4, downscaler 506 of FIG. 5) the current image. In some cases, the computing device (or component thereof) may upscale (e.g., by upscaler 418 of FIG. 4, upscaler 516 of FIG. 5) the motion vectors; and upscale (e.g., by upscaler 422 of FIG. 4, upscaler 522 of FIG. 5) the blending weights. In some cases, the past image and the current image are consecutive images of the video.

At block 704, the computing device (or component thereof) may apply the motion vectors to a third image to generate a warped third image. In some cases, the third image comprises a previous output image (e.g., output image 528 of FIG. 5) and the warped fourth image comprises the warped third image. In some examples, the previous output image (e.g., output image 528 of FIG. 5) is an upscaled version of the past image. In some cases, the computing device (or component thereof) may upscale the motion vectors (e.g., by upscaler 516 of FIG. 5); downscale the warped third image (e.g., by downscaler 518 of FIG. 5); and upscale (e.g., by upscaler 522 of FIG. 5) the blending weights. In some examples, the third image comprises the past image (e.g., past image 404 of FIG. 4). In some cases, the computing device (or component thereof) may apply the motion vectors to a previous output image (e.g., by a motion compensation engine 414 of FIG. 4) to generate a warped previous output image, wherein the warped fourth image comprises the warped previous output image.

At block 706, the computing device (or component thereof) may generate blending weights (e.g., by the blending weights engine 420 of FIG. 4, blending weights engine 520 of FIG. 5) based on a comparison between the warped third image and the current image, wherein the blending weights are generated using a second machine learning model (e.g., of the blending weights engine 420 of FIG. 4, blending weights engine 520 of FIG. 5).

At block 708, the computing device (or component thereof) may upscale the current image (e.g., by spatial upscaling engine 430 of FIG. 4, spatial upscaling engine 530 of FIG. 5) to generate an upscaled current image, wherein the upscaled current image is upscaled by a third machine learning model (e.g., of the spatial upscaling engine 430 of FIG. 4, spatial upscaling engine 530 of FIG. 5). In some cases, the computing device (or component thereof) may generate an anti-aliased upscaled image (e.g., anti-aliased upscaled image 606 of FIG. 6) from the current image; generate spatial blending weights (e.g., spatial blending weights 608 of FIG. 6) based on an input image and/or the anti-aliased upscaled image; generate an upscaled image with upscaled textures (e.g., texture-enhanced upscaled image 614 of FIG. 6); and combine (e.g., by the combining engine 610 of FIG. 6) the anti-aliased upscaled image and upscaled image with upscaled textures based on the spatial blending weights to generate the upscaled current image (e.g., upscaled current image 612 of FIG. 6).

At block 710, the computing device (or component thereof) may combine (e.g., by the temporal blending engine 424 of FIG. 4, temporal blending engine 524 of FIG. 5) the upscaled current image and a warped fourth image using the blending weights to generate an upscaled output image.

At block 712, the computing device (or component thereof) may output the upscaled output image (e.g., output image 426 of FIG. 4, output image 526 of FIG. 5).

In some cases, the devices or apparatuses configured to perform the operations of the process 700 and/or other processes described herein may include a processor, microprocessor, microcomputer, or other component of a device that is configured to carry out the steps of the process 700 and/or other process. In some examples, such devices or apparatuses may include one or more sensors configured to capture image data and/or other sensor measurements. In some examples, such computing device or apparatus may include one or more sensors and/or a camera configured to capture one or more images or videos. In some cases, such device or apparatus may include a display for displaying images. In some examples, the one or more sensors and/or camera are separate from the device or apparatus, in which case the device or apparatus receives the sensed data. Such device or apparatus may further include a network interface configured to communicate data.

The components of the device or apparatus configured to carry out one or more operations of the process 700 and/or other processes described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 700 is illustrated as a logical flow diagram, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 700 and/or other processes) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some examples, computing system 800 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example computing system 800 includes at least one processing unit (CPU or processor) 810 and connection 805 that couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, camera, accelerometers, gyroscopes, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.10 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some examples, a hardware service that performs a particular function can include the software component stored in a computer-readable medium in connection with the necessary hardware components, such as processor 810, connection 805, output device 835, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the present disclosure include:

Aspect 1. An apparatus for image processing, comprising: at least one memory; and at least one processor coupled to the at least one memory and configured to: generate motion vectors representing differences between a past image of a video and a current image of a video, wherein the current image occurs after the past image in the video, wherein the motion vectors are generated using a first machine learning model; apply the motion vectors to a third image to generate a warped third image; generate blending weights based on a comparison between the warped third image and the current image, wherein the blending weights are generated using a second machine learning model; upscale the current image to generate an upscaled current image, wherein the upscaled current image is upscaled by a third machine learning model; combine the upscaled current image and a warped fourth image using the blending weights to generate an upscaled output image; and output the upscaled output image.

Aspect 2. The apparatus of Aspect 1, wherein the third image comprises a previous output image and the warped fourth image comprises the warped third image.

Aspect 3. The apparatus of Aspect 2, wherein the previous output image is an upscaled version of the past image.

Aspect 4. The apparatus of any of Aspects 2-3, wherein the at least one processor is further configured to: upscale the motion vectors; downscale the warped third image; and upscale the blending weights.

Aspect 5. The apparatus of any of Aspects 1-4, wherein the third image comprises the past image.

Aspect 6. The apparatus of Aspect 5, wherein the at least one processor is further configured to apply the motion vectors to a previous output image to generate a warped previous output image, wherein the warped fourth image comprises the warped previous output image.

Aspect 7. The apparatus of Aspect 1-6, wherein the at least one processor is further configured to: downscale the past image; and downscale the current image.

Aspect 8. The apparatus of Aspect 7, wherein the at least one processor is further configured to: upscale the motion vectors; and upscale the blending weights.

Aspect 9. The apparatus of any of Aspects 1-8, wherein the past image and the current image are consecutive images of the video.

Aspect 10. The apparatus of any of Aspects 1-9, wherein, to upscale the current image, the at least one processor is further configured to: generate an anti-aliased upscaled image from the current image; generate spatial blending weights based on at least one of the current image or the anti-aliased upscaled image; generate an upscaled image with upscaled textures; and combine the anti-aliased upscaled image and upscaled image with upscaled textures based on the spatial blending weights to generate the upscaled current image.

Aspect 11. The apparatus of any of Aspects 1-10, further comprising at least one camera configured to capture the past image and the current image.

Aspect 12. The apparatus of any of Aspects 1-11, further comprising at least one display configured to display the upscaled output image.

Aspect 13. A method for image processing, comprising: generating motion vectors representing differences between a past image of a video and a current image of a video, wherein the current image occurs after the past image in the video, wherein the motion vectors are generated using a first machine learning model; applying the motion vectors to a third image to generate a warped third image; generating blending weights based on a comparison between the warped third image and the current image, wherein the blending weights are generated using a second machine learning model; upscaling the current image to generate an upscaled current image, wherein the upscaled current image is upscaled by a third machine learning model; combining the upscaled current image and a warped fourth image using the blending weights to generate an upscaled output image; and outputting the upscaled output image.

Aspect 14. The method of Aspect 13, wherein the third image comprises a previous output image and the warped fourth image comprises the warped third image.

Aspect 15. The method of Aspect 14, wherein the previous output image is an upscaled version of the past image.

Aspect 16. The method of any of Aspects 12-15, further comprising: upscaling the motion vectors; downscaling the warped third image; and upscaling the blending weights.

Aspect 17. The method of any of Aspects 13-16, wherein the third image comprises the past image.

Aspect 18. The method of Aspect 17, further comprising applying the motion vectors to a previous output image to generate a warped previous output image, wherein the warped fourth image comprises the warped previous output image.

Aspect 19. The method of Aspect 13-18, further comprising: downscaling the past image; and downscaling the current image.

Aspect 20. The method of Aspect 19, further comprising: upscaling the motion vectors; and upscaling the blending weights.

Aspect 21. The method of any of Aspects 13-20, wherein the past image and the current image are consecutive images of the video.

Aspect 22. The method of any of Aspects 13-21, wherein upscaling the current image comprises: generating an anti-aliased upscaled image from the current image; generating spatial blending weights based on at least one of the current image or the anti-aliased upscaled image; generating an upscaled image with upscaled textures; and combining the anti-aliased upscaled image and upscaled image with upscaled textures based on the spatial blending weights to generate the upscaled current image.

Aspect 23. A non-transitory computer-readable medium having stored thereon instructions that, when executed by at least one processor, cause the at least one processor to perform operations according to any of Aspects 13 to 22.

Aspect 24: An apparatus for image processing, comprising one or more means for performing operations according to any of Aspects 13 to 22.

What is claimed is:
1. An apparatus for image processing, comprising:
at least one memory; and
at least one processor coupled to the at least one memory and configured to:
generate motion vectors representing differences between a past image of a video and a current image of a video, wherein the current image occurs after the past image in the video, wherein the motion vectors are generated using a first machine learning model;

apply the motion vectors to a third image to generate a warped third image;
downscale the warped third image;
generate blending weights based on a comparison between the downscaled warped third image and the current image, wherein the blending weights are generated using a second machine learning model;
upscale the blending weights;
upscale the current image to generate an upscaled current image, wherein the upscaled current image is upscaled by a third machine learning model;
combine the upscaled current image and a warped fourth image using the upscaled blending weights to generate an upscaled output image; and
output the upscaled output image.

2. The apparatus of claim 1, wherein the third image comprises a previous output image and the warped fourth image comprises the warped third image.

3. The apparatus of claim 2, wherein the previous output image is an upscaled version of the past image.

4. The apparatus of claim 2, wherein the at least one processor is further configured to:
upscale the motion vectors.

5. The apparatus of claim 1, wherein the third image comprises the past image.

6. The apparatus of claim 5, wherein the at least one processor is further configured to apply the motion vectors to a previous output image to generate a warped previous output image, wherein the warped fourth image comprises the warped previous output image.

7. The apparatus of claim 1, wherein the at least one processor is further configured to:
downscale the past image; and
downscale the current image.

8. The apparatus of claim 7, wherein the at least one processor is further configured to:
upscale the motion vectors.

9. The apparatus of claim 1, wherein the past image and the current image are consecutive images of the video.

10. The apparatus of claim 1, wherein, to upscale the current image, the at least one processor is further configured to:
generate an anti-aliased upscaled image from the current image;
generate spatial blending weights based on at least one of the current image or the anti-aliased upscaled image;
generate an upscaled image with upscaled textures; and
combine the anti-aliased upscaled image and upscaled image with upscaled textures based on the spatial blending weights to generate the upscaled current image.

11. The apparatus of claim 1, further comprising at least one camera configured to capture the past image and the current image.

12. The apparatus of claim 1, further comprising at least one display configured to display the upscaled output image.

13. A method for image processing, comprising:
generating motion vectors representing differences between a past image of a video and a current image of a video, wherein the current image occurs after the past image in the video, wherein the motion vectors are generated using a first machine learning model;
applying the motion vectors to a third image to generate a warped third image;
downscaling the warped third image;
generating blending weights based on a comparison between the downscaled warped third image and the current image, wherein the blending weights are generated using a second machine learning model;
upscaling the blending weights;
upscaling the current image to generate an upscaled current image, wherein the upscaled current image is upscaled by a third machine learning model;
combining the upscaled current image and a warped fourth image using the upscaled blending weights to generate an upscaled output image; and
outputting the upscaled output image.

14. The method of claim 13, wherein the third image comprises a previous output image and the warped fourth image comprises the warped third image.

15. The method of claim 14, wherein the previous output image is an upscaled version of the past image.

16. The method of claim 14, further comprising:
upscaling the motion vectors.

17. The method of claim 13, wherein the third image comprises the past image.

18. The method of claim 17, further comprising applying the motion vectors to a previous output image to generate a warped previous output image, wherein the warped fourth image comprises the warped previous output image.

19. The method of claim 18, further comprising:
downscaling the past image; and
downscaling the current image.

20. The method of claim 19, further comprising:
upscaling the motion vectors.

21. The method of claim 13, wherein the past image and the current image are consecutive images of the video.

22. The method of claim 13, wherein upscaling the current image comprises:
generating an anti-aliased upscaled image from the current image;
generating spatial blending weights based on at least one of the current image or the anti-aliased upscaled image;
generating an upscaled image with upscaled textures; and
combining the anti-aliased upscaled image and upscaled image with upscaled textures based on the spatial blending weights to generate the upscaled current image.

23. A non-transitory computer-readable medium having stored thereon instructions that, when executed by at least one processor, cause the at least one processor to:
generate motion vectors representing differences between a past image of a video and a current image of a video, wherein the current image occurs after the past image in the video, wherein the motion vectors are generated using a first machine learning model;
apply the motion vectors to a third image to generate a warped third image;
downscale the warped third image;
generate blending weights based on a comparison between the downscaled warped third image and the current image, wherein the blending weights are generated using a second machine learning model;
upscale the blending weights;
upscale the current image to generate an upscaled current image, wherein the upscaled current image is upscaled by a third machine learning model;
combine the upscaled current image and a warped fourth image using the upscaled blending weights to generate an upscaled output image; and
output the upscaled output image.

24. The non-transitory computer-readable medium of claim 23, wherein the third image comprises a previous output image and the warped fourth image comprises the warped third image.

25. The non-transitory computer-readable medium of claim 24, wherein the previous output image is an upscaled version of the past image.

26. The non-transitory computer-readable medium of claim 24, wherein the instructions cause the at least one processor to:
upscale the motion vectors.

27. The non-transitory computer-readable medium of claim 23, wherein the third image comprises the past image.

28. The non-transitory computer-readable medium of claim 27, wherein the instructions cause the at least one processor to apply the motion vectors to a previous output image to generate a warped previous output image, wherein the warped fourth image comprises the warped previous output image.

29. The non-transitory computer-readable medium of claim 23, wherein the instructions cause the at least one processor to:
downscale the past image; and
downscale the current image.

30. The non-transitory computer-readable medium of claim 29, wherein the instructions cause the at least one processor to:
upscale the motion vectors.

\* \* \* \* \*